United States Patent [19]
Fuentes et al.

[11] Patent Number: 5,862,117
[45] Date of Patent: Jan. 19, 1999

[54] DEVICE, IN PARTICULAR A COMPACT DISC, COMPRISING A DATA STORAGE MEDIUM AND AN INTEGRATED CIRCUIT

[75] Inventors: Vincent Fuentes, Chez-le-Bart; Peter Umminger, Tschugg, both of Switzerland

[73] Assignee: EM Microelectronic-Marin SA, Marin, Switzerland

[21] Appl. No.: 835,647

[22] Filed: Apr. 10, 1997

[30] Foreign Application Priority Data

Mar. 12, 1997 [EP] European Pat. Off. .............. 97104099

[51] Int. Cl.$^6$ .................................................... G11B 7/00
[52] U.S. Cl. ............................ 369/100; 369/53; 369/124
[58] Field of Search ..................................... 369/100, 124, 369/126, 272, 275.1, 276, 44.11, 44.41, 47, 49, 52, 53, 54, 58, 59, 32, 31

[56] References Cited

U.S. PATENT DOCUMENTS 4,562,487  12/1985  Hurst, Jr. et al. ...................... 369/59 X
4,575,770  3/1986  Dieterich ............................... 369/59 X

FOREIGN PATENT DOCUMENTS 8-187981  7/1996  Japan .

*Primary Examiner*—Muhammad N. Edun
*Attorney, Agent, or Firm*—Richard K. Robinson

[57] ABSTRACT

The compact disk comprise a data storage medium (2) for optical reading situated in an annular region (4), which defines a central region (6) wherein is arranged an electronic module, formed of an electronic unit (12), in particular an integrated circuit, and an antenna formed by a winding (14), made of an electrically conductive material. The electronic module allows contactless electromagnetic coupling with an electromagnetic wave transmitter-receiver able to communicate with said electronic unit. In particular, this electronic unit comprises an identification code and/or a decoding key for the data contained in said storage medium.

20 Claims, 6 Drawing Sheets

DEVICE, IN PARTICULAR A COMPACT DISC, COMPRISING A DATA STORAGE MEDIUM AND AN INTEGRATED CIRCUIT

The present invention concerns a device comprising a data storage medium or carrier intended for an electronic data processing installation which includes a first read head arranged for reading the data from said storage medium, this device also comprising an electronic unit having a memory in which other data can be recorded, this electronic unit being associated with means for coupling with a second read head of the electronic processing installation arranged for reading such other data.

More particularly, the present invention concerns disks comprising a data storage medium allowing optical or magnetic reading. Thus the present invention concerns both audio and video compact disks and computer floppy disks.

With current technical means, compact disks and computer floppy disks may be copied relatively easily. In many cases, the copies are illegal and are used for a parallel market thereby depriving the companies which developed and put onto the market a new product of substantial profits. Various solutions have already been proposed to limit, or prevent copying of compact disks or computer floppy disks. In particular, patent document U.S. Pat. No. 5,119,353, discloses a compact disk comprising in it central part an integrated circuit forming a non-volatile programmable memory, in particular an $E^2$-PROM memory. In the central region of the disk an electric connecting device, comprising a plurality of external electric contact pads, is also provided. Such compact disks are intended for an electronic data processing installation in which a complementary electric connecting device to that provided in the compact disk is also provided. This complementary connecting device is associated with a control system of the installation and is moved by means of a motor thus allowing an electric connection to be established between the installation control system and the integrated circuit provided in the compact disk, in particular via a buffer memory.

In order to protect access to the data of the storage medium recorded so as to be read optically (hereinafter, the data for optical reading), it is provided to encode the data for optical reading when it is recorded on the storage medium provided for this purpose and to introduce into the integrated circuit the decoding key or algorithm for such data. Thus, for an installation intended for such compact disks, only compact disks comprising an integrated circuit with the decoding key will be able to be read by this installation. Moreover, copying of such compact disks is made much more difficult, or impossible given that the integrated circuit may be designed exclusively for a manufacturer of compact disks with a data access protocol which is complex and dedicated to such manufacturer. Copies which do not comprise the integrated circuit and the electric connecting device are easily identifiable so that illegal copies can easily be identified on the market. By imposing such compact disks and the corresponding installations, in particular audio compact disk players, the parallel market of illegal copies becomes significantly more difficult to maintain.

The man skilled in the art has available a multitude of possibilities for encoding data and for the decoding algorithm, as for protecting such decoding algorithm contained in the integrated circuit.

The compact disk disclosed in patent document U.S. Pat. No. 5,119,353 and the electronic processing installation associated therewith are of complex design, in particular the electronic processing installation. In order to have access to the data contained in the integrated circuit, the installation includes a removable electric connector associated with a motor which belongs thereto, the motor allows movement of the electric connector so as to bring the different electric contacts to press against the external electric contact pads of the electric connecting device arranged in the compact disk.

In addition to being expensive, such a device has at least two other major drawbacks. First, it is necessary to be able to position the compact disk very precisely in relation to the electric connector of the electronic processing device so as to allow superposition of the electric contacts of such connector with the corresponding electric contact pads of the compact disk connecting device. This is technically difficult and certainly requires use of position sensors. Then, since the motor allows movement along an axis perpendicular to the compact disk, the position of the external electric contact pads of the disk must be positioned very precisely, which limits the manufacturing tolerances and certainly reduces the industrial production output of such disks. If one desires to remove problems of positioning the electric connecting device of the compact disk, it is necessary to provide motor means able to actuate the electric connector along two different axes. Such an arrangement is complex, requires space and is consequently expensive. Moreover, impurities deposited either on the external electric contact pads of the disk, or on the contacts of the electric connector of the installation may impair reading of the integrated circuit data.

The second major drawback derives from the fact that reading of the data contained in the integrated circuit can only be carried out when the compact disk has stopped, i.e. when it is not being driven in rotation.

An aim of the present invention is to overcome the various aforementioned drawbacks.

The invention therefore concerns a device comprising a storage medium for first data intended for an electronic data processing installation comprising first reading means arranged for reading said first data from said storage medium, this device also comprising an electronic unit having a memory in which second data may be integrated or recorded, this electronic unit being associated with means for coupling with second reading means of said processing installation arranged for reading said second data. This device is characterised in that the means for coupling with said second reading means are formed by an antenna which is electrically connected to said electronic unit.

In the particular case where the device is a compact disk, the first reading means are formed by an optical head, in particular a head generating a laser beam. The second reading means are preferably formed by an electromagnetic wave transmitter-receiver, in particular within radio frequency ranges, also comprising an antenna adapted in frequency and impedance to allow electromagnetic coupling with the antenna provided in the compact disk. The man skilled in the art speaks in particular of RFID techniques for such systems. In the description which follows, such a transmitter-receiver will be called a magnetic head.

As a result of the present invention, only one fixed magnetic head is necessary in the reading installation and further, as will be understood with the aid of the following description, the positioning of this magnetic head in relation to the antenna provided in the compact disk is much less critical than the alignment necessary in the aforecited prior art. Further, the problems of impurities or dirt on the disk or on the magnetic head are no longer critical.

Thus, because of its relatively simple and reliable arrangement, the longevity of the device according to the present invention and the electronic processing installation associated thereto is greater than the compact disk and the installation proposed in the aforecited prior art. Access to the data of the electronic unit situated in the device forming a data storage medium by electronic antennae arranged so as to be able to communicate with each other increases the overall reliability of the system. As a result of the present invention, several alternative constructions are possible for the manufacturer, which makes manufacturing easy given that the manufacturer has great freedom in the design of the reading installation and for the arrangement of the antenna in the device of the invention.

Moreover, it is possible to provide reading of data or certain data contained in the electronic unit of the device according to the invention by a portable magnetic head or other contactless means, for example in shops, passing a cash register or at a customs point during a customs check.

The present invention also concerns a data processing installation adapted to devices according to the invention and thus the overall "device-installation" system.

The present invention will be described in detail hereinafter with the aid of the following description, which is made with reference to the attached drawings, given by way of non-limiting example, in which.

First, it will be noted that, although the drawings only show compact disks or computer floppy disks, the present invention is not limited to such disks, but may be also be applied in particular to video cassettes or other data storage mediums.

Figure 1:
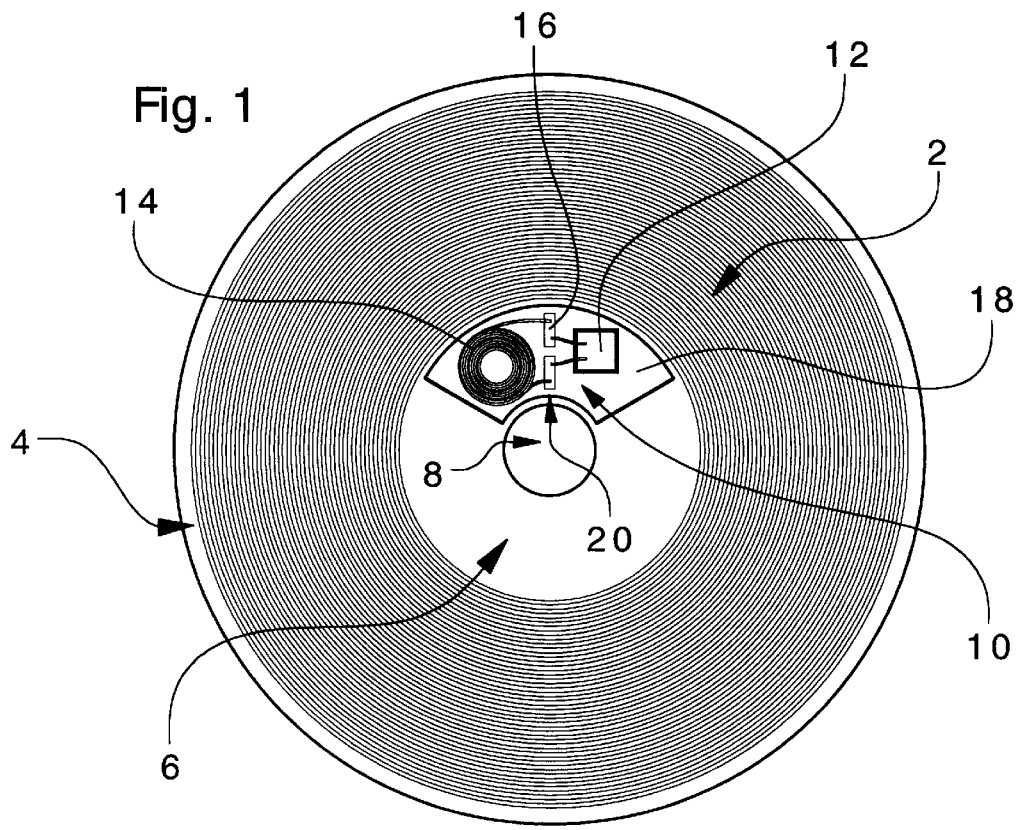
FIGS. 1 and 2 are two schematic top views of two alternatives of a first embodiment of the invention.

FIG. 1 shows a compact disk or a computer floppy disk comprising a data storage medium or carrier 2 for optical or magnetic reading. Storage medium 2 is conventional and the manufacturing thereof is known to the man skilled in the art. Storage medium 2 defines a first annular region 4 wherein this storage medium extends and also a circular central region 6 which has at its middle an opening 8. In the case of a compact disk, this opening 8 is generally free to allows positioning of the disk in a reading installation, in particular a compact disk player. However, in the case of a computer floppy disk, an element attached to the rotating part is generally arranged in opening 8 to allow the disk to be driven in rotation, given that the disk is generally protected by an envelope.

In central region 6, between storage medium 2 and opening 8 an electronic module 10 is arranged. Electronic module 10 is formed of an electronic unit 12 and a winding 14 formed of an electric material and forming an antenna. This winding or coil 14 is electrically connected to electronic unit 12 by means of electric contact pads 16 which are provided on substrate 18 on which electronic unit 12 and winding 14 are arranged in a fixed manner. Substrate 18 has the shape of an annular sector arranged between opening 8 and annular region 4. In an alternative embodiment, arc 20 which is defined by the contour of substrate 18 is the same as the edge of opening 8. Thus, when the compact disk is manufactured, it is easy to position substrate 18.

Electronic module 10 preferably forms a passive transponder, but may also form an active transceiver. In particular, electronic unit 12 comprises a memory of any type known to the man skilled in the art, in particular an $E^2$-PROM memory. According to the desired application, electronic unit 12 may also include a micro-processor allowing data to be processed either to complete the data contained in storage medium 2 or for security measures for the data stored in such storage medium. In the simplest alternative, the memory included in unit 12 is a ROM while in a more advanced alternative, this memory is programmable.

The man skilled in the art may define an access protocol for the data stored in electronic unit 12 which belongs to the product of the present invention. Moreover, the man skilled in the art has available numerous possibilities for encoding the data of storage medium 2 and for introducing into electronic unit 12 the decoding key or algorithm for such data. Very high security levels may be obtained for access to the data contained in electronic unit 12, which allows the use of the compact disk or computer floppy disk to be monitored, in particular the number of times that a programme has been installed in different machines and many other data useful for monitoring the use of the compact disk or computer floppy disk, in particular as far as computer files which can be copied onto computer hard disks are concerned.

Moreover, such a device is associated with an electronic data processing device which is arranged so as only to allow proper processing of the data when it has been able to establish that it is dealing with an original disk, thanks to the presence of electronic unit 12. By way of example, electronic unit 12 is formed by an integrated circuit arranged directly on substrate 18.

Figure 2:
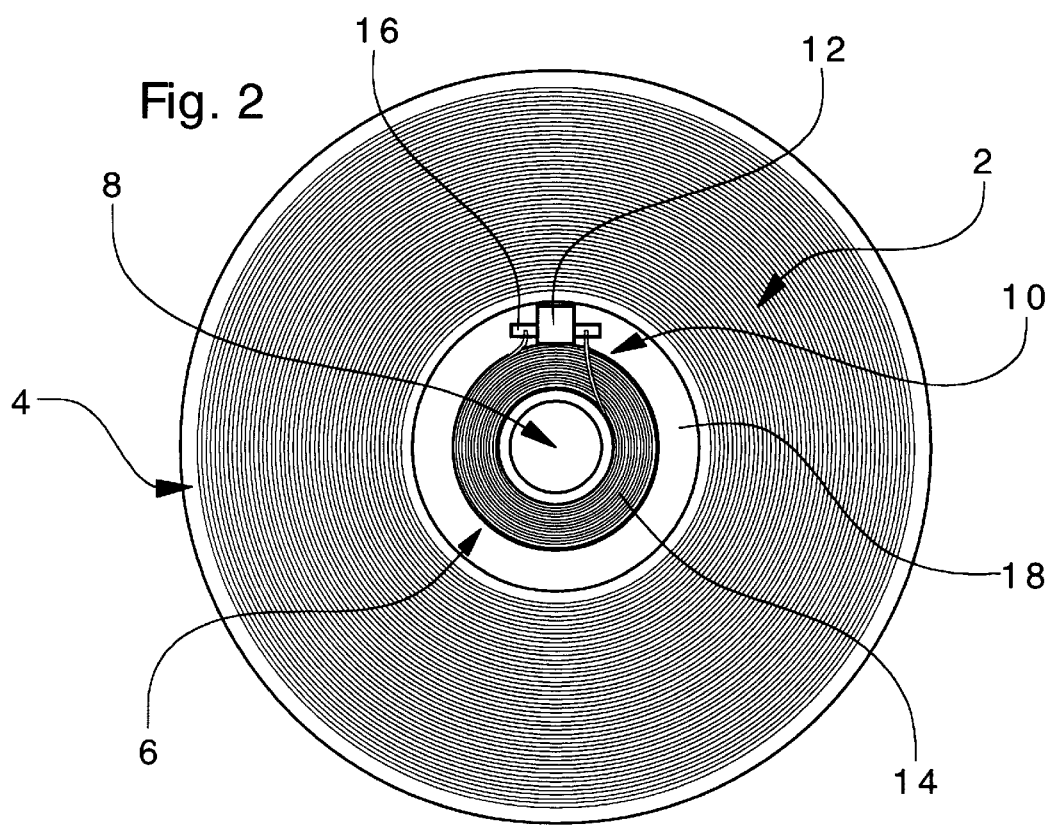

FIG. 2 shows an alternative of the disk of FIG. 1. In central region 6, winding 14 is arranged concentric with opening 8. Electronic unit 12 is situated outside winding 14 and substrate 18 has an annular shape which is particularly advantageous for manufacturing the disk, in particular for positioning electronic module 10 at the heart of the disk according to the invention.

It will be noted that in FIGS. 1 and 2, winding 14 is formed by an electric wire both ends of which being bonded onto the two electric contact pads 16 which are in electric contact with electronic unit 12.

Figure 3:
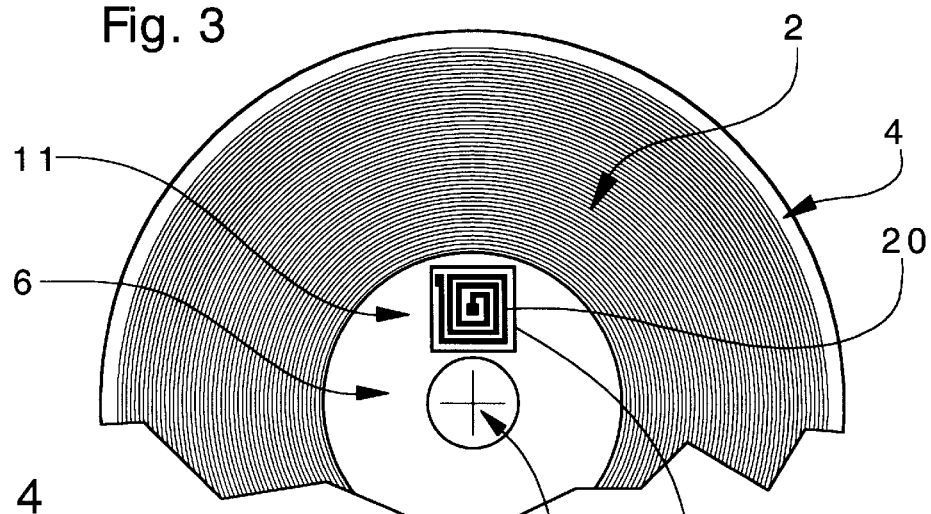
FIG. 3 is a schematic partial top view of a second embodiment of the invention.

The embodiment disclosed in FIG. 3 is distinguished by the fact that electronic module 11 is formed by an electronic unit 12 on one face of which a winding 20 is arranged. Electronic module 11 thus forms a compact structure which can easily be manoeuvred and integrated into the device according to the invention. It will be noted that the electronic module is arranged in central part 6 between storage medium 2 and opening 8. This electronic module 10 is preferably embedded in the disk.

Figure 4:
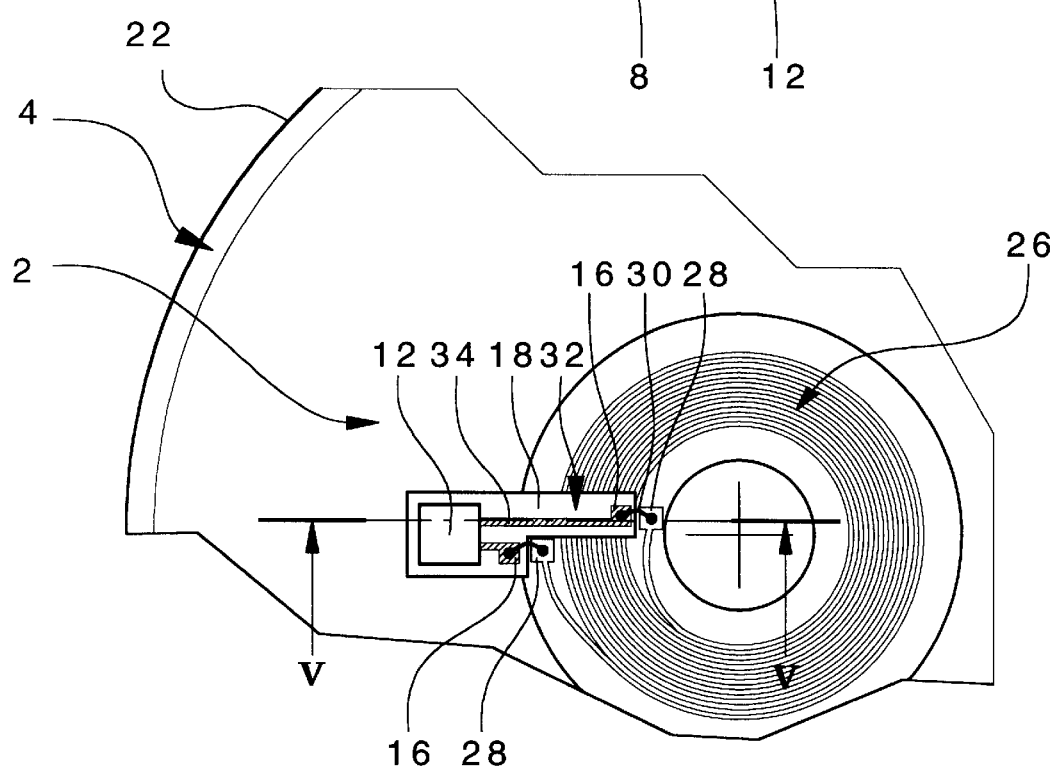
FIG. 4 is a partial schematic bottom view of a third embodiment.
Figure 5:
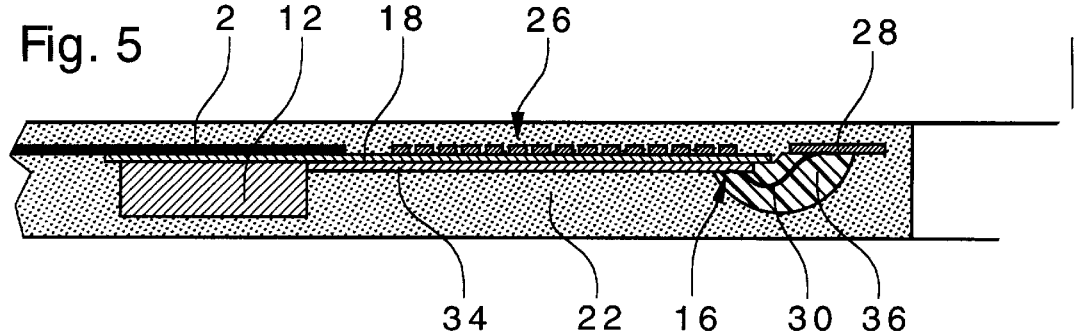
FIG. 5 is a schematic cross-section along line V—V of FIG. 4.

With the aid of FIGS. 4 and 5, a third embodiment of the invention will be described hereinafter. The compact disk comprises a storage medium 2 arranged in an annular region 4 and comprising data to be read optically and an electronic module 24 formed of a substrate 18 on which is arranged an electronic unit 12 and electric contact pads 16 which are electrically connected to unit 12. Storage medium 2 is formed by a sheet disposed in the upper part of the body of disk 22. A winding 26 formed by metallisation or by cutting a metal film is arranged substantially at the same level as storage medium 2. At both ends of winding 26 two electric contact pads 28 are provided, allowing an electric connection to be established between electronic unit 12 and winding 26 by means of electric connection wires 30. Electronic module 24, or more particularly substrate 18, is partially bonded to the back of storage medium 2 and above winding 26. More particularly, in order to allows the two ends of winding 26 to be properly connected to the two electric contact pads 16 of module 24, substrate 18 has an elongated part 32 on which is arranged an electric track 34 connecting a pad 16 to electronic unit 12. Only this elongated part 32 covers winding 26 in a traverse direction, which allows good electric insulation to be assured, and prevents any short circuit between electric connecting wires 30 and winding 26. Electric connecting wires 30 are protected by drops of adhesive material 36.

Figure 6:
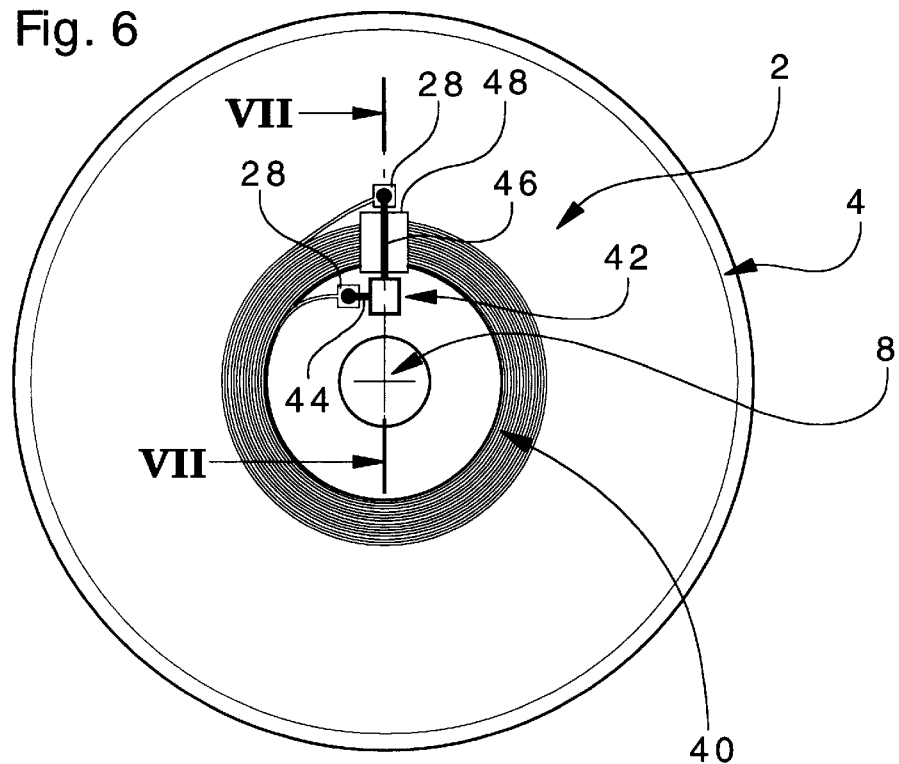
FIG. 6 is a schematic bottom view of a fourth embodiment.
Figure 7:
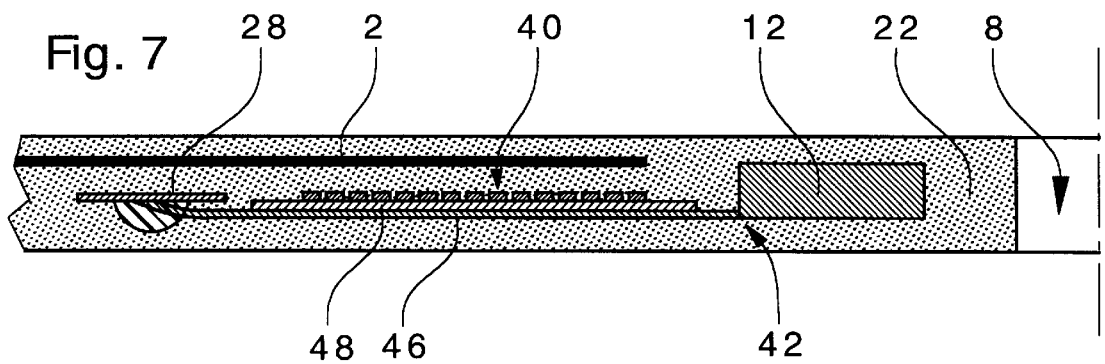
FIG. 7 is a schematic cross-section along line VII—VII of FIG. 6.

FIGS. 6 and 7 show a fourth embodiment of a compact disk according to the invention. Compact disk 22 includes a storage medium 2 which is similar to that of the third embodiment. Winding 40 forming an antenna is formed either by a technique similar to that mentioned for the third embodiment, or by a wire forming a spiral defining a flat coil. There is further provided an electronic module 42 formed of an electronic unit 12 and two electrically conductive lugs 44 and 46 allowing electronic unit 12 to be electrically connected to two electric contact pads 28 situated at the two ends of winding 40. The respective ends of lugs 44 and 46 are bonded to two pads 28. In order to insulate electrically lug 46 and winding 40, an electric insulator 48 which covers at least partially winding 40 is provided.

Figure 8:
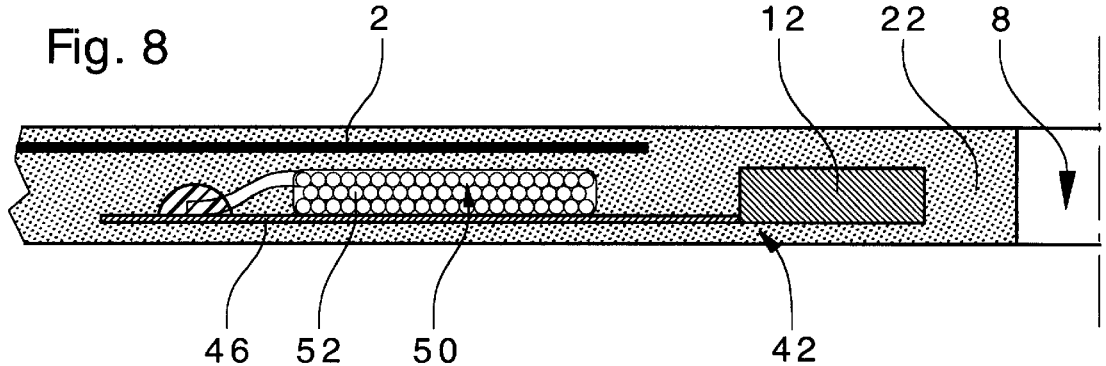
FIG. 8 is a schematic cross-section of an alternative of the fourth embodiment.

FIG. 8 shows an alternative embodiment in which there is provided a winding 50 formed by a wire 52 coated with an insulating material, as is the case in particular for self supporting coils. The two ends of coil 50 are respectively bonded to the two ends of lugs 44 and 46. Given that wire 52 is insulated by an insulating sheath, the body of coil 50 is electrically insulated from conductive lug 46. All of the aforementioned elements are embedded in the body of disk 22.

It will be noted that the references already described previously are not always described again in detail in the different embodiments.

Figure 9:
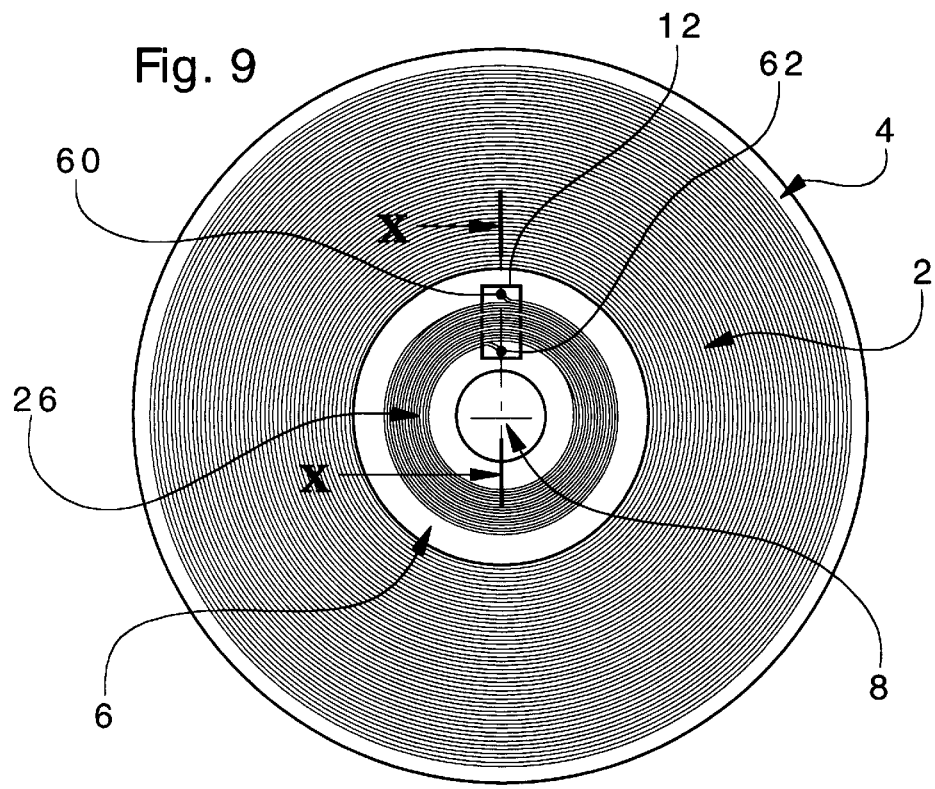
FIG. 9 is a schematic top view of a fifth embodiment.

With the aid of FIGS. 9 to 11 a fifth embodiment of the invention will be described hereinafter.

As in the third embodiment, the compact disk comprises a storage medium 2 and a winding 26 which extend substantially in the same plane. Winding 26 is situated in central part 6 of the disk. This fifth embodiment is distinguished by the arrangement of electronic unit 12 which includes two electric contact pads 54 and 56. This electronic unit 12 is bonded onto winding 26 by means of an anisotropic conductive adhesive material 58. The two pads of ends 60 and 62 of winding 26 are arranged so that they are respectively situated facing pads 54 an 56 of electronic unit 12. Anisotropic conductive adhesive material 58 assures the electric connection between end pads 60 and 62 of winding 26 and respective contact pads 54 and 56 of unit 12.

Figure 10:
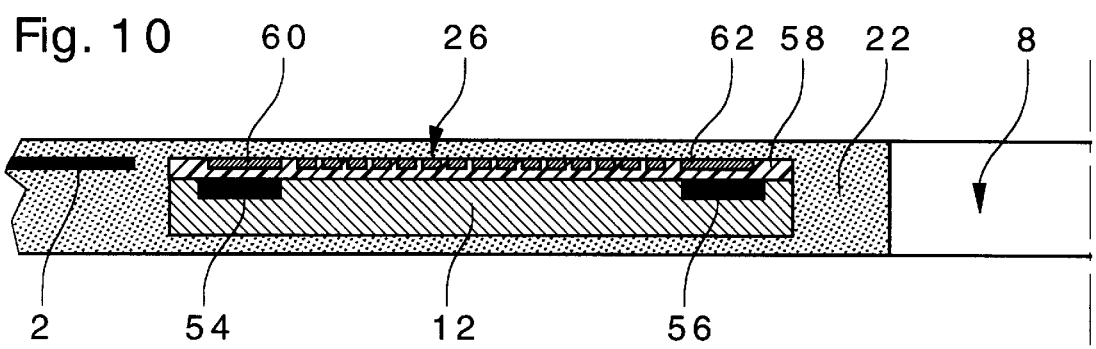
FIG. 10 is a schematic cross-section along line X—X of FIG. 9.

In the alternative shown in FIG. 10, electronic unit 12 is embedded in the body of disk 22 via a technique known to the man skilled in the art. This embodiment is particularly advantageous given that it is relatively simple to manufacture. It requires no substrate, nor bonding wire and allows the body of disk 22 to be formed easily.

Figure 11:
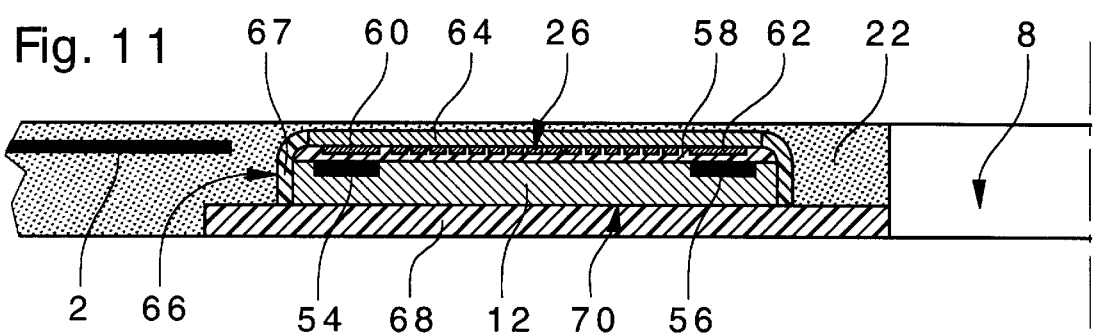
FIG. 11 is a schematic cross-section of an alternative of the fifth embodiment.

FIG. 11 shows a manufacturing alternative. According to this alternative, it is possible to form compact disk body 22 initially by leaving a recess 66 for electronic unit 12 and for the winding arranged on a substrate 64. Again, electronic unit 12 is fixed in recess 66 on winding 26 by means of anisotropic conductive adhesive material 58. Recess 66 is then closed by an annular layer 68, for example a plastic film which is either bonded or hot rolled. It will be noted that it is also possible to provide only one recess 66 having a profile adapted to that of electronic unit 12 and either to cover unit 12 with a closing pellet or disk, or to deposit a bonding material or a resin on the surface 70 of unit 12. In this case, winding 26 and substrate 64 are partially embedded in the body of disk 22. It will be noted that winding 26 and unit 12 may be arranged in an alternative on the other side of substrate 64.

Figure 12:
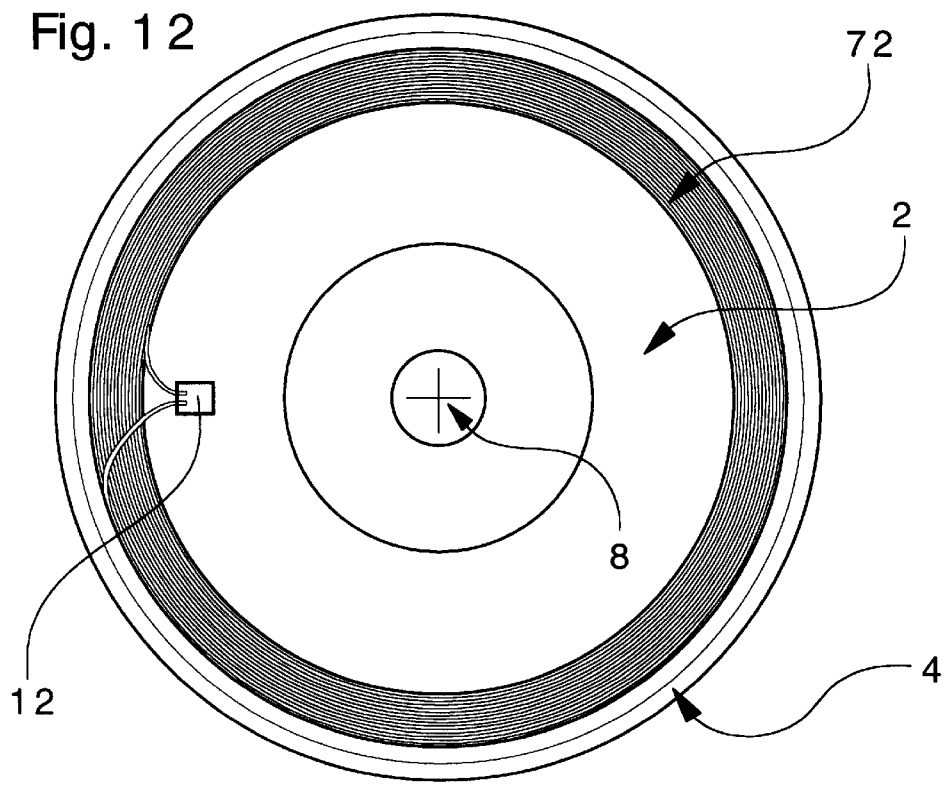
FIGS. 12 and 13 are respectively schematic bottom views of sixth and seventh embodiments.

FIG. 12 shows a fifth embodiment wherein winding 72 is situated on the external part of the disk, this winding 72 and electronic unit 12 being superposed onto storage medium 2. The efficient section of antenna 72 is relatively large and allows in particular the magnetic reading head to be placed in a superposed manner on the internal region of winding 72 in any position.

Figure 13:
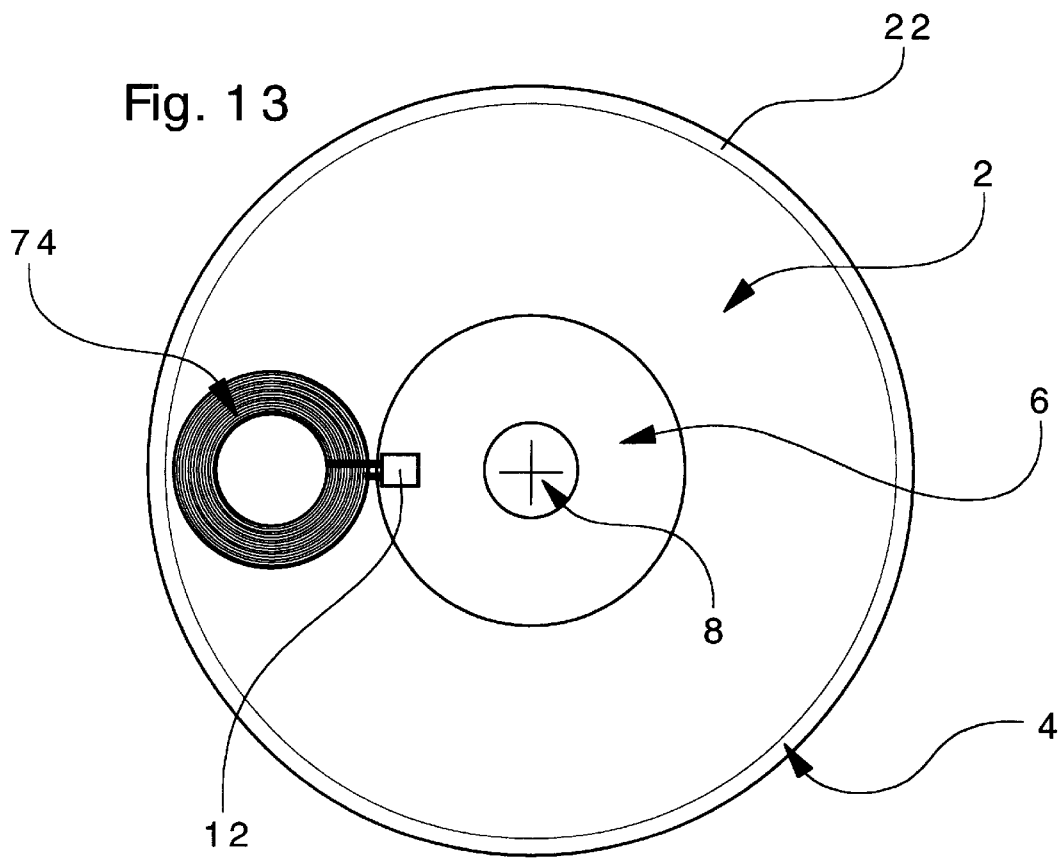

FIG. 13 shows a seventh embodiment wherein winding 74 does not encircle opening 8, but is off-centre in relation to such opening. Electronic unit 12 is located in control region 6. However, in another alternative, unit 12 may also be superposed on storage medium 2 and, in particular, be placed inside winding 74 in relation to a projection in the general plane of compact disk 22.

Figure 14:
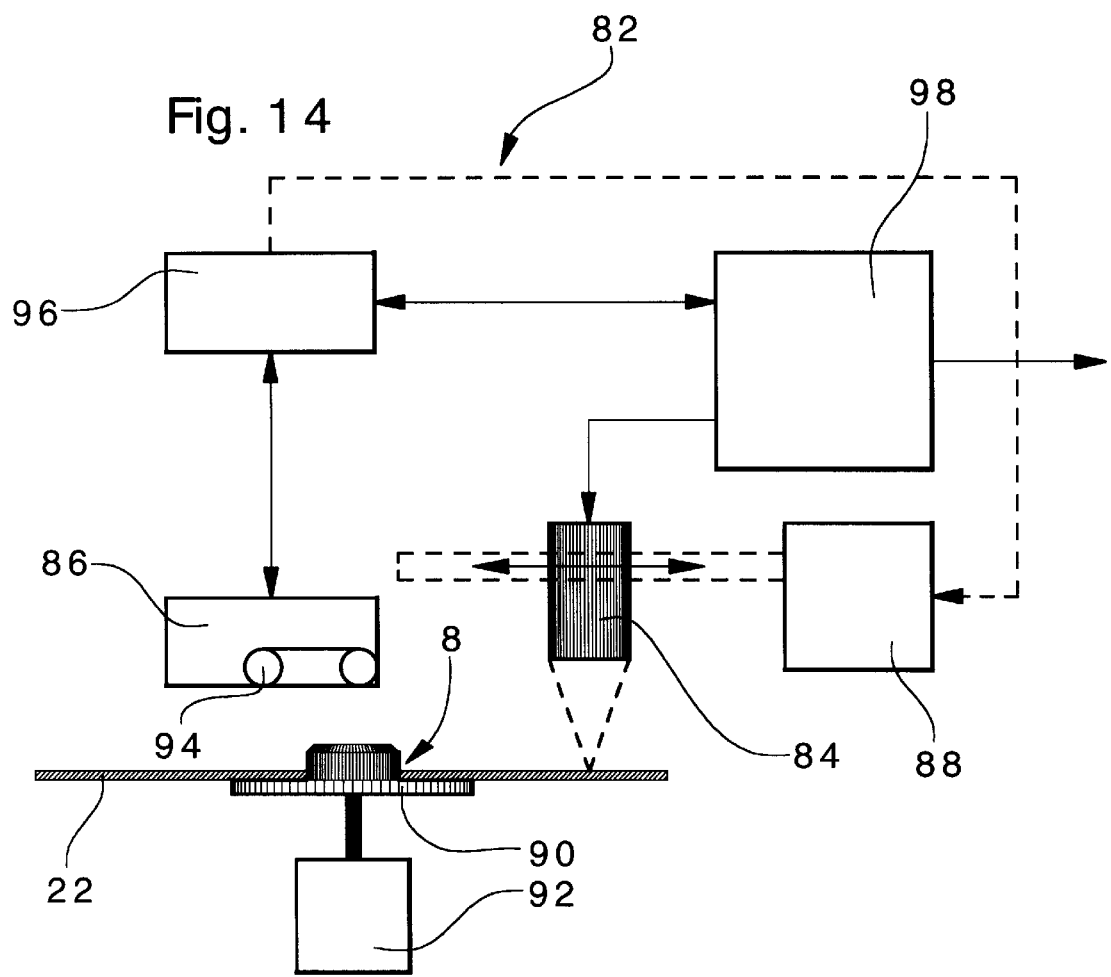
FIG. 14 is a schematic diagram of an electronic data processing installation according to the invention intended for reading the device according to the invention.

With the aid of FIG. 14, an electronic installation for processing data contained in a compact disk 22 according to the invention will briefly be described hereinafter. Installation 82 comprises an optical reading head 84 and a magnetic reading head 86. Optical head 84 is a conventional reading head for reading compact disks. This head 84 is actuated by a motor 88 radially to disk 22 which is arranged on supporting means 90 driven in rotation by a motor 92. Head 84 is used to read the data from storage medium 2 (described above).

Magnetic head 84 comprises an antenna 94 arranged so as to allow electromagnetic coupling with the antenna provided in the device according to the invention, namely in compact disk 22. Head 84 is fixedly arranged inside installation 82. When the winding forming the antenna of disk 22 is concentric with opening 8 or more generally surrounds such opening 8, antenna 94 may be slightly staggered in relation to the axis of rotation of disk 22 while assuring reading at any moment of the data contained in electronic unit 12 (described above) of disk 22. In particular, heads 84 and 86 can read simultaneously respectively storage medium 2 and data from electronic unit 12.

It is understood that, in the case of an antenna arranged concentric with opening 8, the greater the internal diameter of such antenna, the greater the freedom to arranged magnetic head 86 in installation 82, while allowing reading or writing in electronic unit 12 at any moment, even when disk 22 is rotating.

Magnetic head 86 is connected to an electronic control unit 96 which is itself electrically connected to a unit 98 for processing the data read by optical reading head 84. In particular, unit 98 may be used for decoding encoded data by means of a decoding algorithm provided by magnetic head 86 through control unit 96. If control unit 96 does not receive the correct identification code or authorisation from magnetic head 86, it may prevent operation of motor 88 in order to prevent reading of the data contained in storage medium 2 of disk 22. Moreover, in the case in which the data of storage medium 2 is encoded, the electric signal provided by electronic unit 98 will only be correct if control unit 96 has provided the correct decoding key to this electronic unit 98. Other security means may also be provided.

Figure 15:
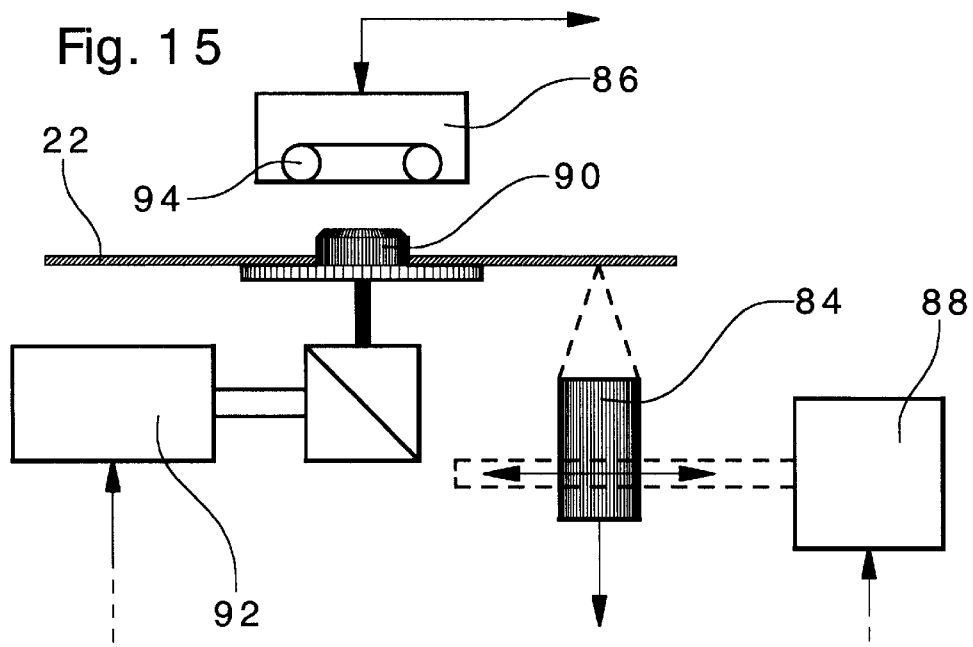
FIG. 15 is an alternative embodiment of the processing installation of FIG. 14.

FIG. 15 shows an alternative embodiment of a processing installation according to the invention. This alternative is distinguished in particular by the fact that antenna 94 is centred on the axis of rotation of disk 22. The optical reading head is arranged on the other side of disk 22 in relation to the side on which magnetic head 86 is situated. The particular arrangement of this magnetic head 86 allows continuous electromagnetic coupling with the antenna of disk 22 for the embodiments wherein the winding forming the antenna surround opening 8. Such a system can be applied to a compact disk player having a cover able to be removed to introduce the disk, the magnetic head being arranged in a fixed position in this cover. The man skilled in the art can design magnetic head 86 and the whole of installation 82, in particular the electronic electromagnetic communication circuits via the respective antennae of disk 22 and magnetic head 86.

What is claimed is:

1. A device comprising a storage medium for first data intended for an electronic data processing installation comprising first reading means arranged for reading said first data of said storage medium, the device also comprising an electronic unit having a memory in which second data may be integrated or recorded, this electronic unit being associated with means for coupling with second reading means of said processing installation arranged for reading said second data, wherein the means for coupling with said second reading means are formed by an antenna which is electrically connected to said electronic unit.

2. A device according to claim 1 forming a compact disk, wherein said electronic unit is formed by an integrated circuit, and wherein said antenna is formed by a winding made of an electrically conductive material.

3. A device according to claim 2, wherein said winding and said electronic unit are arranged on a substrate having the shape of an annular sector arranged between a central opening and an annular region into which said storage medium extends.

4. A device according to claim 2, wherein said winding and said electronic unit are arranged on an annular substrate, the annular substrate and the winding being concentric with a central opening of said device.

5. A device according to claim 2, wherein said winding is formed by an electric wire forming a circular coil.

6. A device according to claim 2, wherein said winding is arranged directly on a face of said electronic unit, the electronic module formed by the electronic unit and the winding being located in a central region of said device defined by an annular region into which said storage medium extends.

7. A device according to claim 2, wherein said electronic unit is arranged on a substrate having an elongated part covering said winding in a traverse direction, this winding having a body and two electric contact pads arranged respectively at its two ends on either side of the body of such winding, said two electric contact pads being connected to two corresponding contact pads arranged on said substrate by means of bonding wire, said elongated part of said substrate electrically insulating said winding from an electric track connecting said electronic unit to one of the two electric contact pads of said substrate.

8. A device according to claim 2, wherein said winding is superposed onto said storage medium, said electronic unit being associated with two electrically conductive tongues and electrically connecting this electronic unit to said two ends of said winding situated on either side of the body of this winding.

9. A device according to claim 8, wherein an insulating layer is provided, said insulating layer covering at least partially said winding so as to insulate the winding electrically from one of the two lugs which traverses in superposition the body of said winding.

10. A device according to claim 8, wherein said winding forms a coil whose electric wire is arranged in an insulating sheath.

11. A device according to claim 2, wherein said electronic unit has two electric contact pads on one of its faces, said electronic unit being fixed onto said winding by means of an anisotropic conductive adhesive material, said electric contact pads of said electronic unit being situated respectively facing two corresponding electric contact pads respectively forming the two ends of said winding.

12. A device according to claim 11, wherein said electronic unit is arranged in a recess closed by an external layer.

13. A device according to claim 11, wherein said winding is arranged on an annular substrate.

14. A device according to claim 7, 8 or 11, wherein said winding is obtained by metallisation or by cutting a metal film.

15. A device according to claim 2, wherein said winding is superposed onto said storage medium and is situated substantially on the periphery of said device.

16. A device according to claim 2, wherein said winding is at least partially superposed onto said storage medium and off-centre with respect to a central opening of such device.

17. A device according to claim 2, wherein said winding is formed by an electric wire extending in a single plane.

18. A device according to claim 2, wherein said winding and said electronic unit are embedded in the body of said device.

19. A data processing installation for a device according to claim 1, wherein it includes a transmitter-receiver of electromagnetic signals arranged for reading said second data of said electronic unit contained in said device.

20. A data processing installation according to claim 19, wherein said transmitter-receiver comprises a communication antenna which has no contact with said antenna included in said device according to claim 1.

\* \* \* \* \*